United States Patent Office 3,423,191
Patented Jan. 21, 1969

3,423,191
METHOD OF STABILIZING ATOMIC N AND FREE RADICALS AND RESULTING PRODUCT
William F. Meyers, Norristown, Pa., assignor to G. & W. H. Corson, Incorporated, Plymouth Meeting, Pa., a corporation of Delaware
No Drawing. Continuation-in-part of application Ser. No. 705,075, Dec. 24, 1957. This application Dec. 4, 1961, Ser. No. 156,949
U.S. Cl. 23—356  3 Claims
Int. Cl. C01b 21/00; C01c 1/00

ABSTRACT OF THE DISCLOSURE

Atomic N and free radical combinations of N and H are stabilized by forming a coordination complex thereof with liquid ammonia, as by anodically oxidizing acidic anhydrous liquid ammonia in the substantial absence of a dehydrogenation catalyst.

---

The present invention relates to a novel method of stabilizing atomic N and free radical combinations of N and H, and to resulting product; and more particularly the invention relates to the production of a stable coordination complex of atomic N and free radical combinations of N and H and liquid ammonia.

The present application is a continuation-an-part of copending application Ser. No. 705,075, filed Dec. 24, 1957.

Free radicals are important research tools. One of the principal problems, however, is to produce them in a form sufficiently stable to permit their investigation or utilization. Free radicals are usually most readily produced, according to known methods, at high temperatures where they are unstable. On the other hand, some degree of stability, again according to known suggestions, can only be achieved at extremely low temperatures, e.g. temperatures of liquid hydrogen which boils at $-252.8°$ C.

It is the principal object of the present invention to provide a novel method for making compositions containing atomic N and free radical combinations of N and H.

Another object of the invention is to provide novel compositions containing atomic N and free radical combinations of N and H.

A further object is to provide a method for stabilizing atomic N and free radical combinations of N and H, and stable compositions comprising one or more of these.

Other objects will become apparent from a consideration of the following specification and claims.

The product of the present invention is a normally unstable chemical substance selected from the group consisting of atomic N and free radical combinations of N and H, stabilized by coordination with anhydrous liquid ammonia. The stable coordination complex may be designated by the formula $N_xH_y \cdot zNH_3$, where $N_xH_y$ is the normally unstable chemical substance in which $x$ is selected from 1 and 2 and in which $y$ is selected from 0, 1, and 2, and where $z$ is the coordination number, most likely 1. The normally unstable chemical substances, $N_xH_y$, thus include $NH_2$, $NH$, atomic N and active $N_2$. The product may actually be a mixture of two or more of such substances stabilized by coordination with the $NH_3$. As will be discused more fully hereinatfer, the product may be prepared and used in the form of a solution in excess anhydrous liquid ammonia.

The product is prepared by the anodic oxidation of acidic anhydrous liquid ammonia in the substantial absence of a dehydrogenation catalyst, and recovering from the anolyte a product rich in the stated complex.

As is apparent, the complex is prepared from relatively cheap and readily available materials, the anhydrous liquid ammonia and an ammonium salt to render the ammonia acidic. The complex itself or as a concentrate in anhydrous liquid ammonia is essentially non-toxic and is stable at ordinary atmospheric temperatures under pressure or in a sealed container, and, therefore, is essentially non-harmful and can be safely prepared, handled and stored.

The preparation of the product, as stated, comprises anodically oxidizing acidic anhydrous liquid ammonia in the substantial absence of a dehydrogenation catalyst. By acidic anhydrous liquid ammonia is meant anhydrous liquid ammonia containing $NH_4^+$ ions which may be provided by an ammonium salt the anion of which is more non-metallic than iodine in the electropotential series in liquid ammonia, such as ammonium perchlorate, ammonium chloride, ammonium bromide, and the like. The ammonium salt may be added as such to the liquid ammonia before commencing anodic oxidation or may be formed in situ by the action of the process on a salt of a highly active metal like lithium. The concentration of the ammonium salt in the anhydrous liquid ammonia may be as low as about 0.001 molar. The upper limit of concentration is not critical and may correspond to the saturation point of the particular salt in anhydrous liquid ammonia, although concentrations below about 4 molar will generally be adequate.

The anodic oxidation may take place in an electrolytic cell provided with an anode and cathode connected to a current source. The anode may be carbon or other conducting, relatively non-catalytic surface, and the cathode may be iron or other metal inert to reduction in liquid ammonia. Provision will be made to prevent the hydrogen produced at the cathode from diffusing through the cell to the anode region, and this may be accomplished by providing a porous or permeable diaphragm between the anode and cathode regions dividing the cell into anode and cathode sections. This renders the product substantially free of atomic H or $H_2$.

During the process, the electrolyte will be at a temperature and pressure sufficient to maintain it in liquid form. Generally, the lower the temperature and the higher the pressure employed, the more stable is the reaction product. Current efficiencies also increase with pressure.

The desired product forms in the anolyte, and the process is continued until the anolyte becomes rich in the complex. The process may be continued until an anolyte product is formed in which the complex is in the desired concentration for direct utilization and the anolyte can be run directly into storage. The anolyte rich in the complex can also be collected and concentrated to provide the complex itself or to provide a concentrate in anhydrous liquid ammonia. Concentration may be accomplished by removing ammonia. Isolation of the complex may also be accomplished by precipitation from the anolyte at low temperatures. On the other hand the complex may be formed is situ at the site of intended utilization. For example the complex may be used as a depolarizer in ammonia electric current-producing cells of the type disclosed and claimed in Patent Nos. 2,863,-933; 2,937,219, and 2,992,289. In such case the complex may be formed in the cell during a preliminary extended "charging" operation, after which the cell may be discharged with the complex serving a depolarizer and providing about twice the voltage as compared to a similar cell without the complex.

For enhanced stability of the complex in solution in anhydrous liquid ammonia, ammonium ions are desirable. These may already be present from the ammonium salt included or formed in the original electrolyte, or an ammonium salt of the type discussed above may be added.

Usually only a small amount of ammonium ions, at least about 0.01 gram $NH_4^+$ per liter of solution are needed.

The preparation of the complex of the present invention, as well as its utilization as a depolarizer in an ammonia electric current producing cell, are illustrated in the following specific examples which are given for the purpose of illustration only and are not intended to limit the scope of the invention in any way.

EXAMPLE I

A U-shaped cell is provided with a carbon rod anode and a clean iron rod cathode, and, after thorough drying and evacuation, the cell is charged with a 3.5 molar solution of anhydrous ammonium perchlorate in anhydrous liquid ammonia. A glass wool wad at the bottom of the cell divides it into cathode and anode compartments. The cell is sealed, and it and its contents are maintained at −50° C. The anode and cathode are connected to a current source to supply an anode current density of about 1 ampere per square inch. After 48–96 hours of operation, the anode-anolyte combination is rich in the stated complex and it may be removed and utilized as, for example, a depolarizer in an ammonia electric current-producing cell.

EMF measurements of this product indicate a free energy of formation of the complex of 84±10 kilocalories per mole and a negative delta S at minus 50° C.

EXAMPLE II

This example illustrates the formation of the complex in situ in an ammonia electric current-producing battery of cells and its subsequent utilization as a depolarizer for the cells during discharge.

One-half inch diameter discs of the following materials are placed together in sandwich form in the stated order: (1) polished iron, 5 mils thick; (2) glass fabric, 20 mils thick, which has been dipped in a saturated solution of lithium thiocyanate in anhydrous liquid ammonia at −50° C., and then dried in the absence of moisture; (3) pressed activated carbon, 20 mils thick; and (4) tantalum, 5 mils thick. This assembly constitutes one cell and 19 more are added to the first to provide a single cylindrical assembly or stack of 20 cells. The assembly is then covered with polypropylene leaving the center of the top face of the first polished iron disc and the center of the bottom face of the last tantalum disc exposed. Wire leads are attached to each of these exposed areas; the wire attached to the iron being the negative lead, and the wire attached to the carbon being the positive lead. Holes are made in the polypropylene sheath adjacent each glass fabric disc so that ammonia subsequently applied, will permeate each fabric disc.

The assembly is then placed in an insulated pressure chamber with both lead wires being connected electrically to the exterior of the chamber. Anhydrous ammonia vapor at −40° C. is then admitted to the chamber also held at −40° C. The ammonia vapor enters the cell structure, condensing in the glass fabric discs in conjunction with the dissolution of the lithium thiocyanate. This forms a solution of lithium thiocyanate in liquid ammonia in each glass fabric disc.

The lead wires are then connected to a power source of 100 volts for ten minutes. During the first portion of this period there is formed lithium metal in solution in the ammonia at the surface of each iron disc electrode, and ammonium thiocyanate at each carbon disc-electrolyte interface. As anodic oxidation continues during the remainder of the period, now in the presence of ammonium ions, the complex is formed in the ammonium ion-containing liquid ammonia.

The lead wires are then connected to an external load, and the battery is discharged. A capacity of 1 ampere second over the range of 90 to 80 volts is obtained. A similar battery containing the same constituents but without the complex provides a capacity of 10 coulombs at only about 40 volts.

Considerable modification is possible in the nature, method of preparation and use of the product without departing from the scope of the present invention.

I claim:

1. A stabilized composition consisting essentially of at least one of the normally unstable chemical substances selected from the group consisting of atomic N and free radical combinations of N and H and liquid ammonia.

2. The product of claim 1 in the form of a concentrated solution in anhydrous liquid ammonia.

3. The product of claim 1 substantially free of atomic H and $H_2$.

References Cited

UNITED STATES PATENTS

| | | | |
|---|---|---|---|
| 555,796 | 3/1896 | Whitehead | 23—14 |
| 1,412,873 | 4/1922 | Klein | 23—14 |
| 2,855,353 | 10/1958 | Huff et al. | 204—59 |
| 3,033,766 | 5/1962 | Schechter | 204—59 |

OTHER REFERENCES

Baum et al.: Research in Ultra-Energy Fuels for Rocket Propulsion, Report No. 1149 (Final), A.F.O.S.R.–TR–56–346 A.S.T.I.A., documents No. AD–95432 (unclassified), July 31, 1956, 47 pages, pp. 5 and 6 specifically relied on.

Adrian et al.: "Free Radicals in Inorganic Chemistry," No. 36 of Advances in Chemistry Series by American Chemical Society, 1962, pp. 50–67.

EARL C. THOMAS, *Primary Examiner.*

HOKE S. MILLER, *Assistant Examiner.*

U.S. Cl. X.R.

204—59